United States Patent [19]

Fraley

[11] 4,086,624
[45] Apr. 25, 1978

[54] CURRENT TO VOLTAGE CONVERTER

[75] Inventor: Phillip Edward Fraley, Reading, Pa.

[73] Assignee: Bell Telephone Laboratories Incorporated, Murray Hill, N.J.

[21] Appl. No.: 806,959

[22] Filed: Jun. 15, 1977

[51] Int. Cl.² ............................................. H02M 7/00
[52] U.S. Cl. .................................. 363/127; 307/127; 307/138
[58] Field of Search ............... 307/127, 138, 255, 288; 328/26; 363/127

[56] References Cited

U.S. PATENT DOCUMENTS

| | | | |
|---|---|---|---|
| 2,994,044 | 7/1961 | Straube | 307/255 X |
| 3,434,034 | 3/1969 | Garber et al. | 363/127 |
| 3,665,221 | 5/1972 | Wickliff | 363/127 |
| 3,819,951 | 6/1974 | Moore | 307/255 X |

Primary Examiner—William M. Shoop
Attorney, Agent, or Firm—Lester H. Birnbaum

[57] ABSTRACT

Disclosed is a circuit for converting a current input of either polarity to a low voltage output of a single polarity. The circuit includes two pairs of pnp-npn transistors which are coupled to that current flow in one direction will turn on one pair while the other is reverse biased, and the same polarity will appear at the output regardless of the polarity of the input. The low voltage at the output is established by the voltage drop across the transistors of the pair which are conducting. The circuit is particularly suited for converting telephone line current to a voltage output of 1.5 volts or less.

7 Claims, 2 Drawing Figures

CURRENT TO VOLTAGE CONVERTER

BACKGROUND OF THE INVENTION

This invention relates to a current to voltage converter and in particular to a circuit which can convert an input current of either polarity to a fixed low voltage output of a single polarity.

In present integrated circuit technology, there are many areas where a low voltage source is needed. In particular, in telephone station sets, it is desirable to provide a variety of logic circuitry requiring a fixed voltage. For example, I$^2$L logic circuits operate on a voltage of 0.8 volts and above. Light emitting diode circuits are also finding increasing use for dial illumination and for providing a visual indication of hook status in multiple line service.

Such auxiliary circuitry is usually powered from local power at the customer's premises by means of a transformer. Although reliable, the transformer accounts for about one half of the on-premises installation cost. Further, accidental removal of the transformer from the local power outlet causes service problems.

It is therefore desirable to have such circuits operate from telephone line power. One problem which must be taken into account, however, is the frequent polarity reversals on the line. A further problem is to keep the AC impedance of the circuitry as low as possible so as not to adversely affect speech transmission. Although modifications can be made in the telephone circuit to compensate for loss of power, it would be more economical to retrofit auxiliary circuitry onto existing telephone sets.

It is therefore an objective of the invention to provide some means for converting telephone line power to a fixed voltage for retrofitting auxiliary circuitry onto present telephone sets while adding a minimum of AC impedance. It is a further objective of the invention to allow the circuit to operate from a single polarity regardless of any polarity reversals on the telephone line.

SUMMARY OF THE INVENTION

These and other objects are achieved in accordance with the invention which is a circuit for converting a current input of either polarity to a low voltage output of a single polarity.

The circuit comprises two pnp-npn transistor pairs which are connected so that only one pair is conducting for either polarity of the input and the same polarity always appears at the output. In accordance with one embodiment, the emitter-base junctions of a pair are serially connected to produce an output voltage of approximately 1.4 volts. In a further embodiment, the voltage is reduced to approximately 1 volt by connecting a diode in series with each emitter-base junction and coupling the emitter-base junctions of the pairs in parallel.

BRIEF DESCRIPTION OF THE DRAWING

These and other features of the invention will be delineated in detail in the following description. In the drawing.

DETAILED DESCRIPTION

Figure 1:
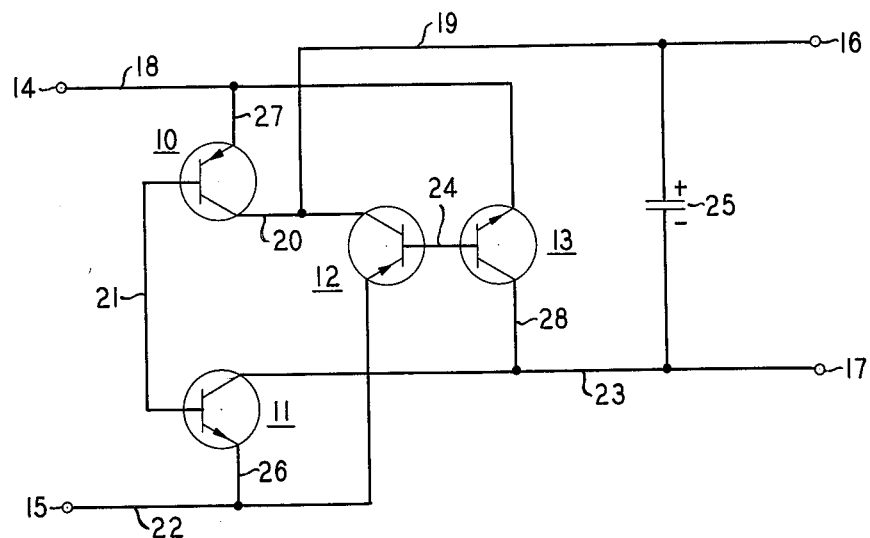
FIG. 1 is a diagram of a circuit in accordance with one embodiment of the invention.

One embodiment of the invention will be described with reference to the circuit diagram of FIG. 1. For purposes of illustration, input terminals 14 and 15 and output terminals 16 and 17 are shown. In actual practice, the circuit of the present invention would be interconnected with other circuitry and would probably not contain definable "terminals." Also, the circuit would be fabricated as an integrated circuit according to standard technology. It will therefore be appreciated that the conductors to be described may not be distinct elements but may be part of the circuit chip as, for example, highly doped zones of semiconductor material. The use of the term "conductors" is therefore meant to convey an electrical connection by whatever means is suitable, including possible use of a semiconductor zone in common with several elements.

The basic components of the circuit are a first pair of transistors 10 and 11, and a second pair of transistors 12 and 13. One transistor in each pair, 10 and 12 in this example, has an emitter of p-type conductivity, a base of n-type conductivity and a collector of p-type conductivity. The remaining transistor in each pair, 11 and 13, has an emitter of n-type conductivity, a base of p-type conductivity and a collector of n-type conductivity. The transistors employed were standard silicon transistors with diffused emitters and bases, and collectors formed by an epitaxial layer on a silicon substrate. The voltage drop across the emitter-base junction of such standard transistors is approximately 0.7 volts. The fabrication of such transistors is well-known in the art.

The emitter of transistor 10 is coupled to terminal 14 by input conductor 18 and conductor 27 while the collector is coupled to output terminal 16 by output conductor 19 and conductor 20. The base of transistor 10 is coupled to the base of transistor 11 by conductor 21. The emitter of transistor 11 is coupled to input terminal 15 by input conductor 22 and conductor 26, while the collector is coupled to output terminal 17 by output conductor 23. The emitter of transistor 12 is coupled to input terminal 15 by input conductor 22, while the collector is coupled to output terminal 16 by means of conductor 20 and output conductor 19. The base of transistor 12 is coupled in series with the base of transistor 13 by conductor 24. The emitter of transistor 13 is coupled to input terminal 14 by conductor 18, and the collector is coupled to output terminal 17 by output conductor 23 and conductor 28. Also included as an optional feature is capacitor 25 in parallel with conductors 19 and 23 which may be used to store charge for use with pulsing LED circuits.

In one example of the utilization of this circuit, telephone line power in the form of a current of approximately 20 milliamps is supplied to input terminals 14 and 15. The output terminals 16 and 17 are coupled to an LED circuit. In this application, an "LED circuit" includes one or more light-emitting diodes and the associated logic circuitry for operating the diodes in a desired mode. For example, a dc to dc converter such as that shown in *Electronics*, Mar. 6, 1975, pp 95-97 utilizing the oscillator circuit shown in *RCA 1975 Data Book Series*, No. SSD203C, p. 535, FIG. 7 will operate at a low voltage compatible with the invention to power an LED. The invention would also be used with the LED flashing circuit shown in FIG. 1 of *Electronic Design News*, Mar. 20, 1976, pp. 59–66. (The foregoing three references are incorporated by reference herein.) It will be realized, however, that a great variety of circuits which require a low voltage source of a single polarity may be utilized in conjunction with the invention.

As stated previously, the current supplied to input terminals 14 and 15 may have either polarity. When the terminal 14 is positive and 15 is negative, a current $i_1$ through conductors 18 and 27 forward biases transistor 10 to render it conductive and flows through the emitter-collector path and conductors 20 and 19 to output terminal 16. Transistors 12 and 13 are reverse-biased in this mode and so no current flows therethrough. The return current from terminal 17 flows through conductor 23 to the collector of transistor 11. This transistor is made conductive by the current $i_2(20-i_1)$ which flows from the base of transistor 10 to the base of transistor 11 via conductor 21. The current $i_1$ is therefore permitted to flow through transistor 11 and conductors 26 and 22 to input terminal 15 to complete the path. In this mode, terminal 16 is positive and terminal 17 is negative. The voltage drop across the emitter-base junctions of transistors 10 and 11 in this example produces a constant voltage of approximately 1.4 volts across the terminals 16 and 17.

When the polarity is reversed (15 is positive and 14 is negative), the current $i_1$ flows through conductor 22 to the emitter of transistor 12 forward biasing that transistor so that the current flows through the emitter-collector path, conductor 20 and conductor 19 to output terminal 16. The current $i_1$ will not flow through transistors 10 or 11 since they are reverse-biased with this polarity. The return current flow from terminal 17 follows the path of conductors 23 and 28 to the collector of transistor 13. This transistor has been rendered conductive by the current $i_2(20-i_1)$ from the base of transistor 12 to the base of transistor 13 by conductor 24. The current $i_1$ therefore flows through transistor 13 to conductor 18 and terminal 14. Again, the voltage drop across the emitter-base junctions of transistors 12 and 13 produces a constant voltage of approximately 1.4 volts across terminals 16 and 17. It will also be noted that the elements are coupled so that terminal 16 remains positive and 17 remains negative regardless of the polarity at terminals 14 and 15.

In addition to the constant polarity and fixed voltage at the output, the circuit of the present invention has the additional advantage of exhibiting a low AC impedance of approximately 10 ohms due to the current-voltage characteristic of the transistor pairs. This means that the circuit will not have an adverse effect on speech transmission in telephone sets.

Figure 2:
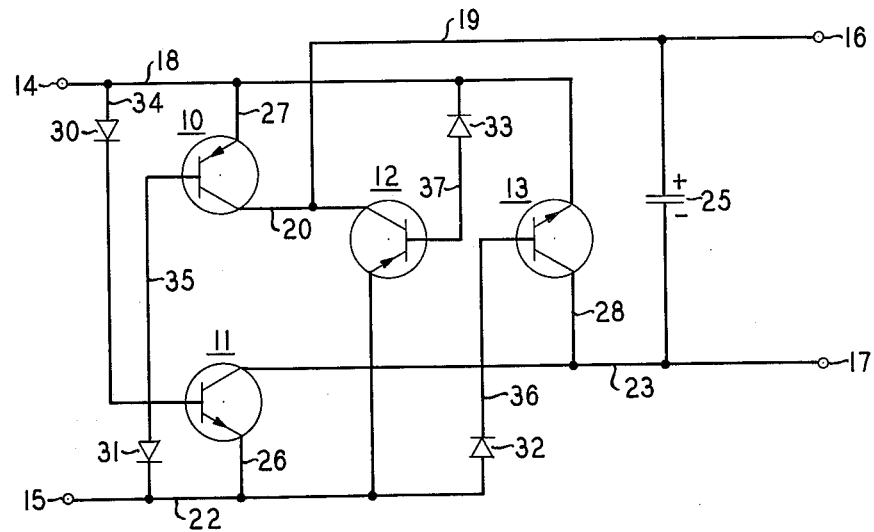
FIG. 2 is a diagram of a circuit in accordance with a further embodiment of the invention.

A further embodiment of the invention is illustrated in the circuit diagram of FIG. 2 wherein elements corresponding to those of FIG. 1 are similarly numbered. In this embodiment, the circuit of FIG. 1 has been modified by the inclusion of silicon Schottky diodes 30, 31, 32, and 33. Diode 30 is coupled in series with input conductor 18 and the base of transistor 11, and diode 31 is connected in series with the base of transistor 10 and output conductor 22. Similarly, diode 33 is coupled in series with the base of transistor 12 and input conductor 18, and diode 32 is coupled in series with conductor 22 and the base of transistor 13. The emitter-base junctions of the transistors in a pair (10 and 11, 12 and 13) are now coupled in parallel so that the voltage at output terminals 16 and 17 is now determined by the voltage drop across one of the transistors in a pair and its associated diode. In particular, a standard silicon Schottky diode drops approximately 0.35 volts so that the output voltage of this circuit is approximately 1.05 volts. If desired, a standard silicon junction diode which drops approximately 0.7 volts may be employed. By using series strings of diodes, therefore, the output voltage can be adjusted to increments of 0.35 or 0.7 volts.

The circuit of FIG. 2 operates in essentially the same manner as the circuit of FIG. 1 already described. The current $i_1$ follows the same paths from terminal 14 (when positive) through transistor 10, conductors 20 and 19 to terminal 16 and back from terminal 17 through conductor 23, transistor 11, and conductors 26 and 22 to terminal 15. In this case, transistor 11 is rendered conductive by current $i_2/2$ flowing through conductor 34 and diode 30 to the base. At the same time, a current $i_2/2$ flows from the emitter base junction of transistor 10 in a parallel path through conductor 35 and diode 31. When the polarity is reversed, the current $i_1$ flows through conductor 22, transistor 12, and conductors 20 and 19 to terminal 16. The return path is through conductors 23 and 28, transistor 13 and conductor 18 to terminal 14. The transistor 13 is rendered conductive by the current $i_2/2$ through conductor 36 and diode 32 to the base. A current $i_2/2$ also follows the parallel path from the base of transistor 12 through conductor 37 and diode 33. Thus, the same features of a low voltage output with a constant polarity are present, with the added feature of adjusting the voltage output by the addition of the diodes.

The above circuits have been described for operation from telephone line current of 20 20 milliamps. Of course, the circuits could be used with other current sources. It appears that a current range of approximately 5-100 milliamps could be used with the present invention. In addition, the output voltage will vary slightly depending upon fabrication variables and current. However, the output of the circuit in FIG. 1 should remain within the range of approximately 1.3-1.6 volts and the output of the circuit of FIG. 2 should be within the range of 0.9-1.2 volts, regardless of such variables.

It will also be noted that the present invention, since it provides a voltage of fixed polarity, may be utilized to charge batteries from the phone line as well as from other current sources.

Various additional modifications will become apparent to those skilled in the art. All such variations which basically rely on the teachings through which the invention has advanced the art are properly considered within the spirit and scope of the invention.

What is claimed is:

1. A circuit for converting a current of either polarity at first and second inputs to a fixed voltage of a single polarity across first and second outputs comprising:

a first pair of transistors with a first transistor having its emitter electrically coupled to the first input and its collector electrically coupled to the first output and a second transistor with its collector electrically coupled to the second output and its emitter electrically coupled to the second input, the bases of said first and second transistors being electrically coupled; and a second pair of transistors with a third transistor having its emitter electrically coupled to the second input and its collector electrically coupled to the first output and a fourth transistor with its emitter electrically coupled to the first input and its collector electrically coupled to the second output, the bases of said fourth and fifth transistors being electrically coupled.

said pairs being coupled so that a different pair is conductive for either of the two polarities of the current at the inputs.

2. The circuit according to claim 1 wherein the bases of the transistors in a pair are electrically coupled so that the voltage at the outputs is determined by the combined voltage across the emitter-base junctions of the conducting pair.

3. The circuit according to claim 1 wherein the first and third transistors each have an emitter of p conductivity type, a base of n conductivity type and a collector of p conductivity type, and the second and fourth transistors have an emitter of n conductivity type, a base of p conductivity type and a collector of n conductivity type.

4. The circuit according to claim 1 further comprising a capacitor coupled across the outputs.

5. A circuit for converting a current of either polarity at first and second input conductors to a fixed voltage of a single polarity across first and second output conductors comprising:

a first pair of transistors with a first transistor having a p-type emitter coupled to the first input conductor, a p-type collector coupled to the first output conductor, and an n-type base directly coupled to a p-type base of a second transistor, said second transistor having an n-type collector coupled to the second output conductor and an n-type emitter coupled to the second input conductor; and a second pair of transistors with a third transistor having a p-type emitter coupled to the second input conductor, a p-type collector coupled to the first output conductor, and an n-type base directly coupled to a p-type base of a fourth transistor, said fourth transistor having an n-type emitter coupled to the first input conductor and an n-type collector coupled to the second output conductor, said pairs being coupled so that a different pair is conductive for either of the polarities of the current at the input conductors and the voltage at the output conductors is determined by the combined voltage across the emitter-base junctions of the conducting pair.

6. A circuit for converting a current of either polarity at first and second input conductors to a fixed voltage of a single polarity across first and second output conductors comprising:

a first pair of transistors with a first transistor having a p-type emitter coupled to the first input conductor, an n-type base coupled through a diode to the second input conductor, and a p-type collector coupled to the first output conductor, and a second transistor having an n-type emitter coupled to the second input conductor, a p-type base coupled through a diode to the first input conductor, and an n-type collector coupled to the second output conductor; and a second pair of transistors with a third transistor having a p-type emitter coupled to the second input conductor, an n-type base coupled through a diode to the first input conductor, and a p-type collector coupled to the first output conductor, and a fourth transistor having an n-type emitter coupled to the first input conductor, a p-type base coupled through a diode to the second input conductor and an n-type collector coupled to the second output conductor, said pairs being coupled so that a different pair is conductive for either of the polarities of the current at the input conductors.

7. A circuit for inverting a current of either polarity at first and second inputs to a fixed voltage of a single polarity across first and second outputs comprising:

a first pair of transistors with a first transistor having its emitter electrically coupled to the first input and its collector electrically coupled to the first output and a second transistor with its collector electrically coupled to the second output and its emitter electrically coupled to the second input, the emitter-base junctions of said transistors being coupled in parallel with at least one diode coupled in series with the base of each transistor; and a second pair of transistors with a third transistor having its emitter electrically coupled to the second input and its collector electrically coupled to the first output and a fourth transistor with its emitter electrically coupled to the first input and its collector electrically coupled to the second output, the emitter-base junctions of said transistors being coupled in parallel with at least one diode coupled in series with the base of each transistor, said pairs being coupled so that a different pair is conductive for either of the two polarities of the current at the inputs and the voltage at the outputs is determined by the voltage across the emitter-base junction and the diode of one transistor in the conducting pair.

* * * * *